US012657060B2

(12) United States Patent
Deshpande et al.

(10) Patent No.: US 12,657,060 B2
(45) Date of Patent: Jun. 16, 2026

(54) ORCHESTRATION OF CONTAINERIZED MICROSERVICES

(71) Applicant: International Business Machines Corporation, Armonk, NY (US)

(72) Inventors: Amit Deshpande, Pune (IN); Srinivas Koushik, New Albany, OH (US); Vishal Anand, Dublin (IE); Nampreet Pal Singh, Pune (IN); Reena Sandhir, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 695 days.

(21) Appl. No.: 17/568,949

(22) Filed: Jan. 5, 2022

(65) Prior Publication Data

US 2023/0214266 A1 Jul. 6, 2023

(51) Int. Cl.
*G06F 9/46* (2006.01)
*G06F 9/50* (2006.01)

(52) U.S. Cl.
CPC ...... *G06F 9/5038* (2013.01); *G06F 2209/505* (2013.01)

(58) Field of Classification Search
CPC ............. G06F 9/5038; G06F 2209/505; G06F 9/50–9/5027; G06F 9/5055; G06F 9/5077; G06F 9/4881
See application file for complete search history.

(56) References Cited

U.S. PATENT DOCUMENTS

| | | | |
|---|---|---|---|
| 10,191,778 B1 * | 1/2019 | Yang | G06F 11/301 |
| 2011/0179041 A1 * | 7/2011 | Souto | G06F 9/5011 |
| | | | 707/E17.014 |
| 2012/0047509 A1 * | 2/2012 | Ben-Itzhak | G06F 9/50 |
| | | | 718/103 |
| 2013/0073703 A1 * | 3/2013 | Das | H04L 67/14 |
| | | | 709/223 |
| 2017/0300359 A1 * | 10/2017 | Kollur | G06F 9/4881 |
| 2020/0019426 A1 | 1/2020 | Doudali | |
| 2021/0149669 A1 | 5/2021 | Catalano | |

FOREIGN PATENT DOCUMENTS

| | | |
|---|---|---|
| CN | 109582452 B | 3/2021 |
| CN | 112486679 A | 3/2021 |

OTHER PUBLICATIONS

"How to Prioritize Your Enterprise Applications for Migration", Velocity News, downloaded from the Internet on Sep. 8, 2021, 5 pages, <https://blog.velocitycloud.com/resources/how-to-prioritize-your-applications-for-migration>.

(Continued)

*Primary Examiner* — Gregory A Kessler
(74) *Attorney, Agent, or Firm* — Seed Intellectual Property Law Group LLP

(57) ABSTRACT

A system may include a memory and a processor in communication with the memory. The processor may be configured to perform operations. The operations may include compiling cost data for at least one node and revenue data for at least one pod. The operations may include calculating a resource value of a node of the at least one node with the cost data and quantifying a priority value of a pod of the at least one pod with the revenue data. The operations may include pairing the priority value of the pod with the resource value of the node and assigning the pod to the node.

20 Claims, 7 Drawing Sheets

<u>400</u>

(56)　　　　　　References Cited

OTHER PUBLICATIONS

"Including pod priority in pod scheduling decisions", downloaded from the Internet on Sep. 8, 2021, 6 pages, <https://docs.openshift.com/container-platform/4.6/nodes/pods/nodes-pods-priority.html>, Copyright © 2021 Red Hat, Inc.

"Pod Priority and Preemption", VMware, Tanzu Developer Center, downloaded from the Internet on Sep. 8, 2021, 4 pages, <https://tanzu.vmware.com/developer/guides/kubernetes/workload-tenancy-priority-preemption/>.

Dziurzanski et al., "Value-Based Allocation of Docker Containers", In: 26th Euromicro International Conference on Parallel, Distributed and Network-based Processing (PDP), Euromicro International Conference on Parallel, Distributed and Network-based Processing, Mar. 21-23, 2018 IEEE , GBR , pp. 358-362, https://doi.org/10.1109/PDP2018.2018.00064, White Rose University Consortium.

Fan et al., "Multi-Objective Optimization of Container-Based Microservice Scheduling in Edge Computing", Computer Science & Information Systems, Jan. 2021, vol. 18 Issue 1, p. 23-42, https://doi.org/10.2298/CSIS200229041F.

Hussein et al., "A placement architecture for a container as a service (CaaS) in a cloud environment", Journal of Cloud Computing: Advances, Systems and Applications, (2019) 8:7, https://doi.org/10.1186/s13677-019-0131-1, 15 pages.

Liu et al., "A new container scheduling algorithm based on multi-objective optimization", ResearchGate, Article in Soft Computing—Dec. 2018, https://doi.org/10.1007/s00500-018-3403-7, 13 pages.

Mell, et al., "The NIST Definition of Cloud Computing, " Recommendations of the National Institute of Standards and Technology, U.S. Department of Commerce, Special Publication 800-145, Sep. 2011, 7 pgs.

Menouer, Tarek, "Kcss: Kubernetes container scheduling strategy", The Journal of Supercomputing, https://doi.org/10.1007/s11227-020-03427-3, Accepted Sep. 2, 2020, © Springer Science+Business Media, LLC, part of Springer Nature 2020, Published online: Sep. 24, 2020, 27 pages.

"Monitor & reduce Kubernetes spend" Kubecost. Stackwatch, Inc. Accessed Dec. 24, 2021. https://www.kubecost.com/, 7 pages.

"Kubernetes Scheduler." Kubernetes. The Linux Foundation, Published Dec. 8, 2021, Accessed Dec. 24, 2021. https://kubernetes.io/docs/concepts/scheduling-eviction/kube-scheduler/, 2 pages.

"Assign Pods to Nodes." Kubernetes. The Linux Foundation, Published May 30, 2020, Accessed Dec. 24, 2021. https://kubernetes.io/docs/tasks/configure-pod-container/assign-pods-nodes/, 3 pages.

"Assign Pods to Nodes Using Node Affinity." Kubernetes. The Linux Foundation, Published May 30, 2020, Accessed Dec. 24, 2021. https://kubernetes.io/docs/tasks/configure-pod-container/assign-pods-nodes-using-node-affinity/, 3 pages.

Ahmad, et al., Container scheduling techniques: A Survey and Assessment, Journal of King Saud University—Computer and Information Sciences, Jul. 2022, vol. 34, Issue 7, pp. 3934-3947.

* cited by examiner

100

200

__400__

| | |
|---|---|
| __410__ | Compile Cost and Revenue Data |

↓

| | |
|---|---|
| __420__ | Calculate Resource Value of Node |

↓

| | |
|---|---|
| __430__ | Quantify Priority Value of Pod |

↓

| | |
|---|---|
| __440__ | Pair Pod Priority and Node Resources |

↓

| | |
|---|---|
| __450__ | Assign Pod to Node |

500C

500N

510

500

500A

500B

600

US 12,657,060 B2

1

ORCHESTRATION OF CONTAINERIZED
MICROSERVICES

BACKGROUND

The present disclosure relates to digital storage manage-
ment and more specifically to container orchestration.

Cloud computing increasingly implements container sys-
tems for deployment. Open-source container environments
offer adaptive load balancing, service registration, deploy-
ment, operation, resource scheduling, and capacity scaling.
A container cluster employs nodes to perform workloads.

SUMMARY

Embodiments of the present disclosure include a system,
method, and computer program product for container
orchestration.

A system in accordance with the present disclosure may
include a memory and a processor in communication with
the memory. The processor may be configured to perform
operations. The operations may include compiling cost data
for at least one node and revenue data for at least one pod.
The operations may include calculating a resource value of
a node of the at least one node with the cost data and
quantifying a priority value of a pod of the at least one pod
with the revenue data. The operations may include pairing
the priority value of the pod with the resource value of the
node and assigning the pod to the node.

The above summary is not intended to describe each
illustrated embodiment or every implement of the disclo-
sure.

BRIEF DESCRIPTION OF THE DRAWINGS

The drawings included in the present application are
incorporated into, and form part of, the specification. They
illustrate embodiments of the present disclosure and, along
with the description, serve to explain the principles of the
disclosure. The drawings are only illustrative of certain
embodiments and do not limit the disclosure.

Figure 1:
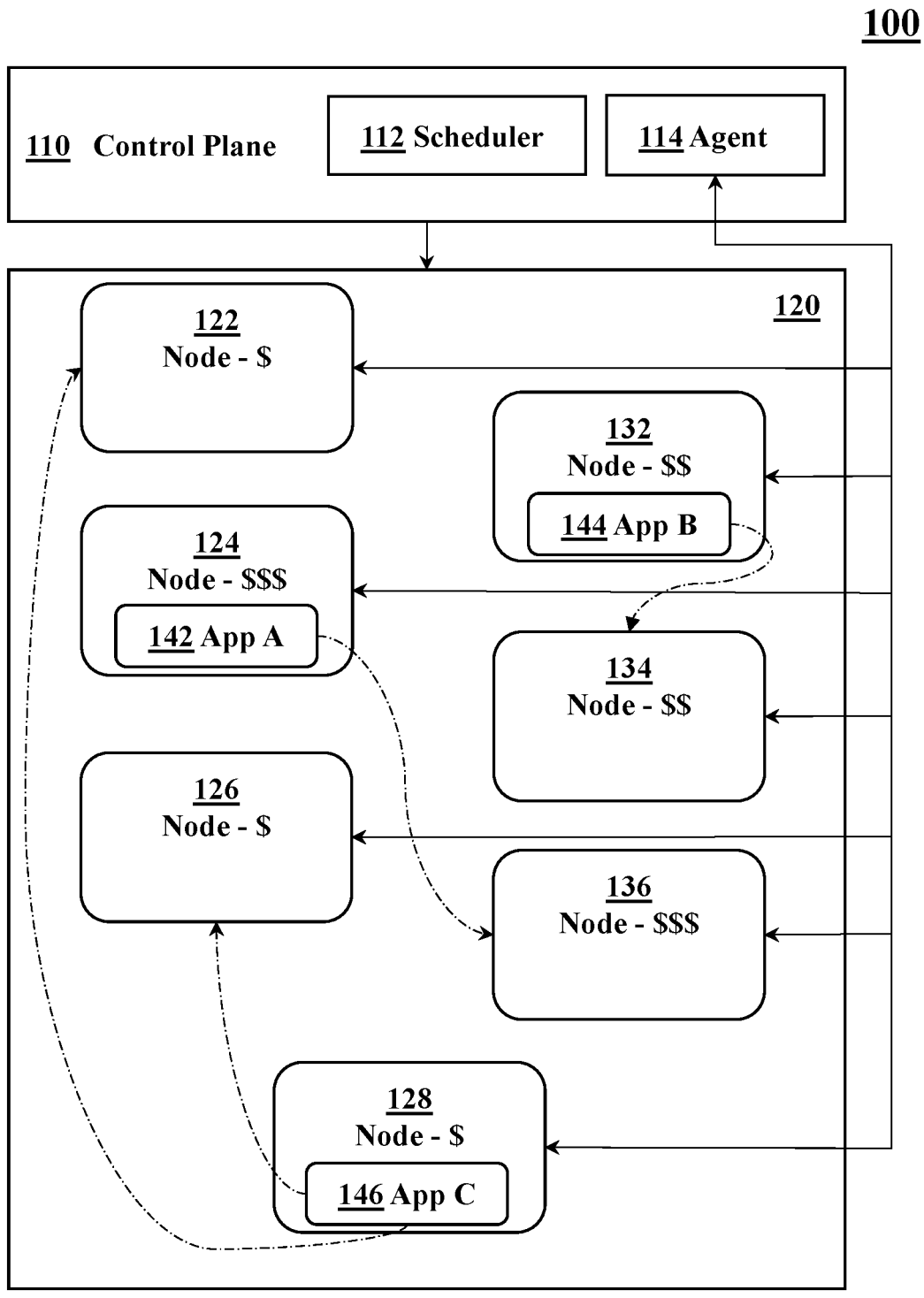
FIG. 1 illustrates a system implementing containerized
orchestration in accordance with some embodiments of the
present disclosure.

While the invention is amenable to various modifications
and alternative forms, specifics thereof have been shown by
way of example in the drawings and will be described in
detail. It should be understood, however, that the intention is
not to limit the invention to the particular embodiments
described. On the contrary, the intention is to cover all modifications, equivalents, and alternatives falling within
the spirit and scope of the invention.

DETAILED DESCRIPTION

Aspects of the present disclosure relate to digital storage
management and more specifically to open-source container
orchestration.

Container orchestration systems (e.g., open-source con-
tainer orchestration systems such as a Kubernetes® cluster,
which may also be referred to as a k8s® cluster) provide
support for automating containerized application deploy-
ment, scaling, and management. Containerized applications
are typically deployed in a unit referred to as a pod, and a
pod may have one or more containers running within it. As
part of pod lifecycle management, a container orchestration
system provides one or more mechanisms for activating
(also referred to as deploying or starting), running, and
deactivating (also referred to as stopping) pods. When a pod
is activated, all containers within that pod may also be
activated; similarly, when a pod stops, all containers within
that pod stop.

A container orchestration system may use multiple
mechanisms to activate multiple pods of the same or similar
deployment. Similarity of deployment may be based on
various parameters such as the number of requests, central
processing unit (CPU) utilization, memory utilization, and
the like. A container orchestration system may use such
systems to implement automatic scaling of an open-source
container system. In accordance with some embodiments of
the present disclosure, managing container availability may
increase resource utilization, increase performance, and/or
improve container and/or pod scheduling by considering
cost and revenue during scheduling.

When a pod is deployed, the system (e.g., an open-source
container system) decides which node the pod is deployed
to. The scheduler may select a node for the pod via filtering
and scoring. The scheduler may then assign the pod to the
node with the highest ranking based on the technical rules
and configurations; these rules and configurations may be set
to defaults (e.g., a standard static configuration or a dynamic
configuration that adjusts to variable thresholds) or manually
configured by users for specific preferences. If multiple
nodes are tied for the highest score, the scheduler may select
one of these nodes at random.

Some pod scheduling algorithms may be based on the
node selectors, affinity, and the like; these are technical
scheduling functions. In accordance with the present disclo-
sure, a system could consider business aspects for schedul-
ing pods within the system. Business aspects could include,
for example, the cost of the nodes in the system and the
revenue expected from the pods and/or tasks awaiting
assignment. The present disclosure considers pod prioriti-
zation based on business aspects and similar considerations.

The present disclosure considers the visibility of associ-
ated business value within a system (e.g., an open-source
container cluster), such as the value derived from one or
more services and/or microservices run by individual pods.
The present disclosure thus enables the prioritization of pods
based on various considerations including business aspects
(e.g., revenue generation, value priorities, and/or other
important non-technical characteristics). The present disclo-
sure considers selecting nodes for specific purposes and
assigning workloads accordingly, thereby enhancing
resource utilization of the system to better meet business
needs.

Moreover, the present disclosure considers dynamic scheduling algorithms. Dynamic scheduling mechanisms may be used, for example, to re-prioritize pods as workloads within the pods change and/or as business priorities shift as well as to re-rank nodes as the resources within each node are allocated.

For example, a cluster may have seven nodes and three pods awaiting scheduling and deployment. The first pod awaiting deployment may be a payments application pod which has a very high business value (e.g., high revenue and relational returns) and a high cost of assignment; this pod may be prioritized for a top tier of service (e.g., platinum). The second pod awaiting deployment may be an inventory application pod which has a medium business value (e.g., modest revenue returns) and a low cost of assignment; this pod may be prioritized for a middle tier of service (e.g., gold or silver). The third pod awaiting deployment may be an internal systems (e.g., human resources) application pod which has a low business value (e.g., no immediate revenue returned) and a low cost of assignment; this pod may be prioritized for a low tier of service (e.g., bronze or pewter).

Some systems may schedule and deploy each of these three pods based on resource requirements, node affinity, and other technical considerations. In accordance with the present disclosure, the priority of each of the pods and the workloads of the services on the pods may also be considered such that technical necessities are met and business priorities are considered.

In some embodiments of the present disclosure, nodes in the cluster may be assigned a priority; the priority may be the scheduling priority, and the priority may be determined based on the value (e.g., business value such as the revenue generated) of the pod and/or the tiered services. The system scheduler may use the pod priority to deploy the pod on a node of a corresponding priority. The node priority may be similarly determined based on value.

In accordance with the present disclosure, a prioritizing agent (e.g., in the control plane and/or as part of the cluster scheduler) may communicate with a node agent to collect node data. The prioritizing agent may be referred to as the kube-finance, kube-fin, Kf agent, scheduling agent, open-source orchestration arrangement data collector, system prioritization overseer, ranking monitor, or the like. The prioritizing agent may be an open-source system native component. In some embodiments, the prioritization agent may be a component of the control plane.

The prioritizing agent may convey node data from the node agent(s) to an application programming interface (API) server. The prioritizing agent may collect the cost data associated with each pod running on each node to aggregate the cost per node. The prioritizing agent may communicate with the API server on the control plane and thereby integrate with the control plane and objects hosted by the control plane. Objects hosted by the control plane may include, for example, datastores, schedulers, controllers, and the like.

In some embodiments, the prioritizing agent may determine the number of trade volumes per day per service or microservice within the pod. Trade volumes may represent the amount of revenue generated from a particular business application. A trade volume may be determined using the number of connections, the amount of data used, the number of API calls, user interactions per set period of time (e.g., minute, hour, day, month, et cetera), and the like. The prioritizing agent may collect metadata containing the trade volume information in addition to information related to associated cost and service tiers.

The prioritizing agent may determine one or more similarities, which may be identified using the collected metadata, between nodes and registers to determine node ranking based on the cost incurred by the nodes. The metadata collected by the prioritizing agent may determine which pod may be scheduled to which node based on the ranking and prioritization processes. Upon determining which node to allocate a pod to, the prioritizing agent may notify the node agent (e.g., a kubelet) of the node selected for hosting a pod to schedule the pod to the node.

In some embodiments, the prioritizing agent may store the metadata. Metadata collection and re-collection may be done automatically (e.g., every five minutes) or manually (e.g., when a user presses a button to update the data) based on user preferences. The type of update and/or the frequency thereof may be configured via standard system configurations such as, for example, by configuring the corresponding configuration file (e.g., the corresponding .yaml file) of the prioritizing agent.

The prioritizing agent may collect metadata for each pod, node, application, service, and/or microservice and retain the metadata for a defined retention period. The retention period may be a default amount of time or a user-defined amount of time. A user may configure the retention period and other preferences such as the frequency of data collection, workload revenue information, node cost data, service tier information, and the like. A user may also finetune configurations for performance purposes by, for example, updating the configuration file of the prioritizing agent.

In some embodiments, the prioritizing agent may determine one or more priority tags to use for future scheduling. If a race condition is met identifying multiple target nodes, the prioritizing agent may register the priority as medium (e.g., "race-any").

The prioritizing agent may be an open-source container system native object; for example, it may be part of the control plane, scheduler, or similar host. The prioritizing agent may collect business application priority information based on, for example, the revenue per pod, the revenue per node, and the like; this business application priority information may be combined with the costs associated with each pod and each node in the cluster to determine a business priority for one or more workloads and/or rankings for potential host nodes. In some embodiments, the prioritizing agent may instruct one or more node agents and/or API servers for scheduling workloads based on business priority.

The prioritizing agent may be used to compile metadata based on various collected data including, for example, cost incurred, revenue generated, business priorities, user preferences, external considerations, and the like.

The prioritizing agent may be used to provide flexibility to users with respect to metadata collection and retention configurations using open-source container system native configuration file settings (e.g., the .yaml file of the prioritizing agent).

In some embodiments of the present disclosure, the prioritizing agent may provide an orchestration mechanism for open-source container system architecture based on non-technical rules and priorities. For example, various business considerations may be accounted for such as the revenue generated by each project and/or workload and the cost of running each node. For example, business rules (e.g., prioritizing a particular project type for receiving platinum tier service) may be implemented in addition to technical screenings (e.g., ensuring a node has the resources to host a pod prior to deployment).

In some embodiments, the prioritizing agent may communicate with various components of the system architecture, such as the API server and the node agents, to compile metadata including, and/or for determining, scheduling priorities. The prioritizing agent may store the metadata in a datastore (e.g., an open-source native datastore such as etcd); the datastore may be replicated across one or more control nodes in the control plane. The prioritizing agent may calculate a priority factor for each workload, application, and/or pod as well as ranking factors for each node and/or potential host. The prioritizing agent may identify and/or store pod and/or node information for scheduling purposes present and future.

In some embodiments, a prioritizing agent may identify multiple nodes as having identical or similar rankings. The prioritizing agent may mark these nodes with equal rank tags (e.g., medium); the prioritizing agent may mark such nodes as "race-any" in the metadata.

Prioritizing agents may be in and/or part of worker nodes, control nodes, control planes, or any combination thereof.

A system in accordance with the present disclosure may include a memory and a processor in communication with the memory. The processor may be configured to perform operations. The operations may include compiling cost data for at least one node and revenue data for at least one pod. The operations may include calculating a resource value of a node of the at least one node with the cost data and quantifying a priority value of a pod of the at least one pod with the revenue data. The operations may include pairing the priority value of the pod with the resource value of the node and assigning the pod to the node.

In some embodiments, the operations may include computing a revenue for a service conducted using the pod.

In some embodiments, the operations may include determining a trade volume per day per microservice within the pod. The trade volume may incorporate trade volume data. Trade volume data may include one or more of a number of connections, an amount of data, an API calls value, an interaction frequency, or some combination thereof. In some embodiments, the operations may further include maintaining the trade volume data, the cost data, and/or the priority data in a database.

In some embodiments, the operations may include collecting metadata for the at least one node and the at least one pod and retaining the metadata for a defined retention period.

In some embodiments, the operations may include determining a priority tag for the pod with the revenue data and retaining the priority tag for future scheduling of the pod.

In some embodiments, the operations may include configuring, by a user, one or more of a cost data collection frequency of the cost data, a revenue data collection frequency of the revenue data, data retention period lengths, service tier information, or some combination thereof.

In some embodiments, the operations may include tuning the pairing for performance.

FIG. 1 illustrates a system 100 implementing containerized orchestration in accordance with some embodiments of the present disclosure. The system 100 includes a control plane 110 and a node worker cluster 120.

The control plane 110 includes a scheduler 112 and a prioritizing agent 114. The prioritizing agent 114 is in contact with nodes 122, 124, 126, 128, 132, 134, and 136 which each may have different rankings. These rankings may be based on, for example, the amount of resources available to the node and/or the cost of running the node.

The control plane 110 may communicate with the node worker cluster 120. The prioritizing agent 114 may communicate with the nodes 122, 124, 126, 128, 132, 134, and 136. The prioritizing agent 114 may collect data from the nodes 122, 124, 126, 128, 132, 134, and 136 to assess resource use, resource availability, and/or node ranking of each node 122, 124, 126, 128, 132, 134, and 136. The nodes 122, 124, 126, 128, 132, 134, and 136 in the system 100 each have rankings indicated by the number of dollar signs ($) on each node 122, 124, 126, 128, 132, 134, and 136; in FIG. 1, more dollar signs indicates a higher ranking.

The scheduler 112 may schedule pod assignments to nodes 122, 124, 126, 128, 132, 134, and 136 based on various resource and business needs. For example, the scheduler 112 may consider the virtual central processing unit (vCPU) resources, memory, and disk space available on each node in addition to node cost, pod revenue, and/or other business values and considerations when deploying pods to nodes.

The scheduler 112 may allocate or re-allocate pods to different nodes 122, 124, 126, 128, 132, 134, and 136. The scheduler 112 may use the information collected by the prioritization agent 114 to this end. For example, the scheduler 112 may identify that a node 124 with the pod running application A 142 could be better utilized and re-allocate the pod to another node 136. The scheduler 112 may also identify, based on the metadata collected by the prioritizing agent 114, that the node 132 hosting the pod running application B 144 may be better utilized and may thus re-allocate that pod to another node 134. The scheduler 112 may determine that the pod running application C 146 may be better served on a node 122 or 126 other than the node 128 currently hosting it and may thus move the pod to the other node. In some embodiments, the pod running application C 146 may be duplicated or split between the two other nodes 122 and 126.

The re-allocation of pods to different nodes in FIG. 1 are between nodes of similar rankings. In some embodiments, the re-allocation of workloads may be between nodes of different rankings. For example, a business priority may have changed, resulting in workload shifting; for example, the pod running application A 142 may have originally had platinum-tier priority but a change in a business relationship (e.g., achieving a collection of higher-priority workloads from the same and/or different clients) may have downgraded the workload to gold-tier priority, resulting in shifting from a high-ranking node 124 to a medium-ranking node 132. Similarly, a pod running application C 128 may have originally been determined to warrant a low-ranking node 128 but a change in a business situation (e.g., an internal policy change requiring immediate attention on a large scale) may result in moving the workload to a high-ranking node 136.

Pod re-allocation in FIG. 1 is shown from nodes 124, 128, and 132 hosting single pods to nodes 122, 126, and 136 not hosting any. In some embodiments, multiple pods may be hosted by the same node, multiple pods may be assigned or re-assigned to the same or different nodes, pods may be reassigned to nodes hosting other workloads, and the like. Pod assignment and allocation may incorporate known technical resource constraint mechanisms as well as business considerations. In some embodiments, initial pod deployment may consider current and projected prioritization values such that the system 100 may prevent unnecessary re-allocation of workloads.

Figure 2:
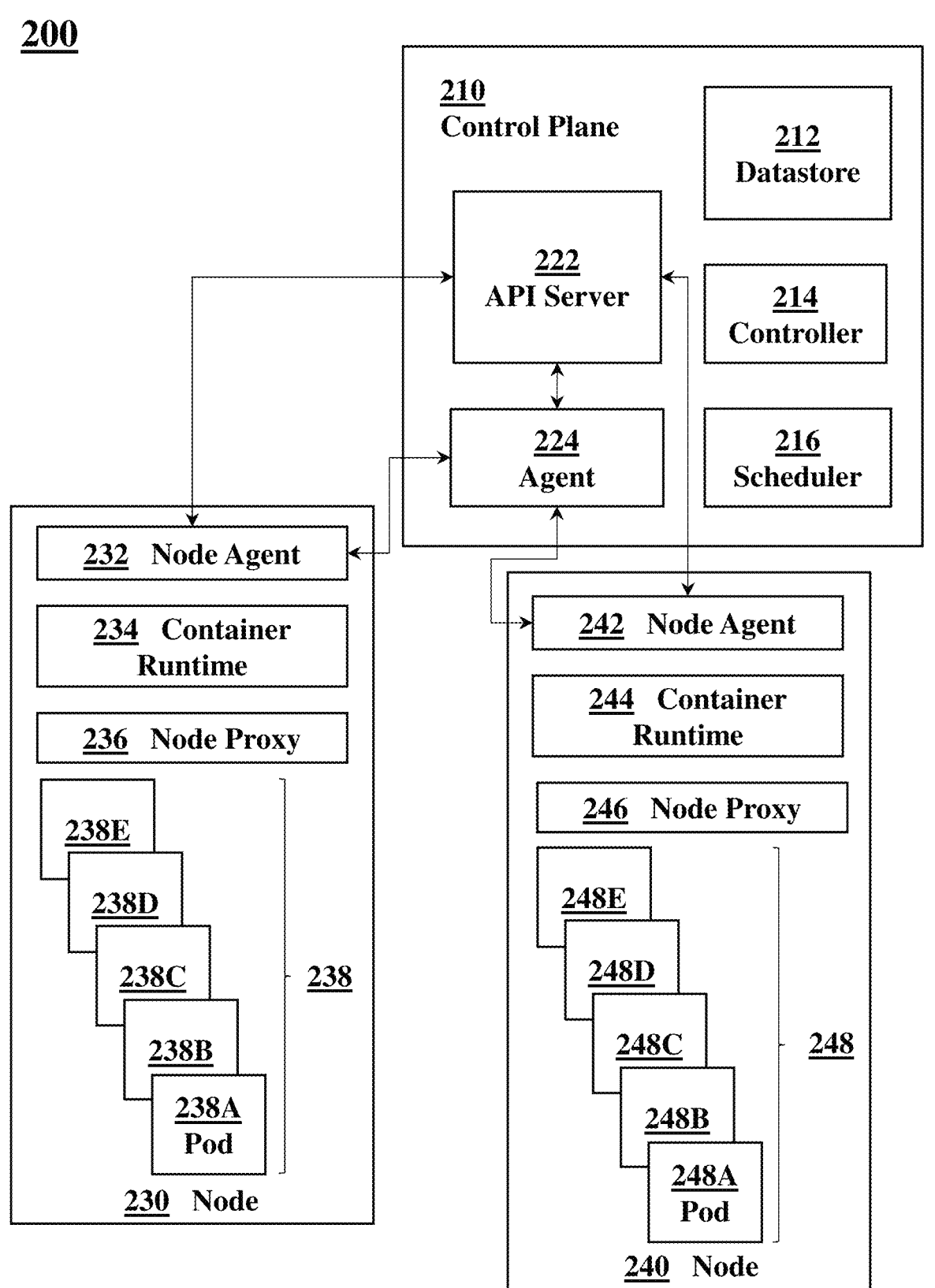
FIG. 2 depicts a system implementing containerized
orchestration in accordance with some embodiments of the
present disclosure.

FIG. 2 depicts a system 200 implementing containerized orchestration in accordance with some embodiments of the present disclosure. The system 200 includes a control plane 210 and nodes 230 and 240.

The control plane 210 includes a datastore 212 (e.g., an etcd), a controller 214, a scheduler 216, an API server 222, and a prioritizing agent 224. The API server 222 and the prioritizing agent 224 are in communication with each other. Additionally, the API server 222 and the prioritizing agent 224 are also each in contact with the node agents 232 and 242 of the nodes 230 and 240 in the system 200. The nodes 230 and 240 each have node agents 232 and 242, container runtimes 234 and 244, node proxies 236 and 246, and pods 238A-238E and 248A-248E.

Figure 3:
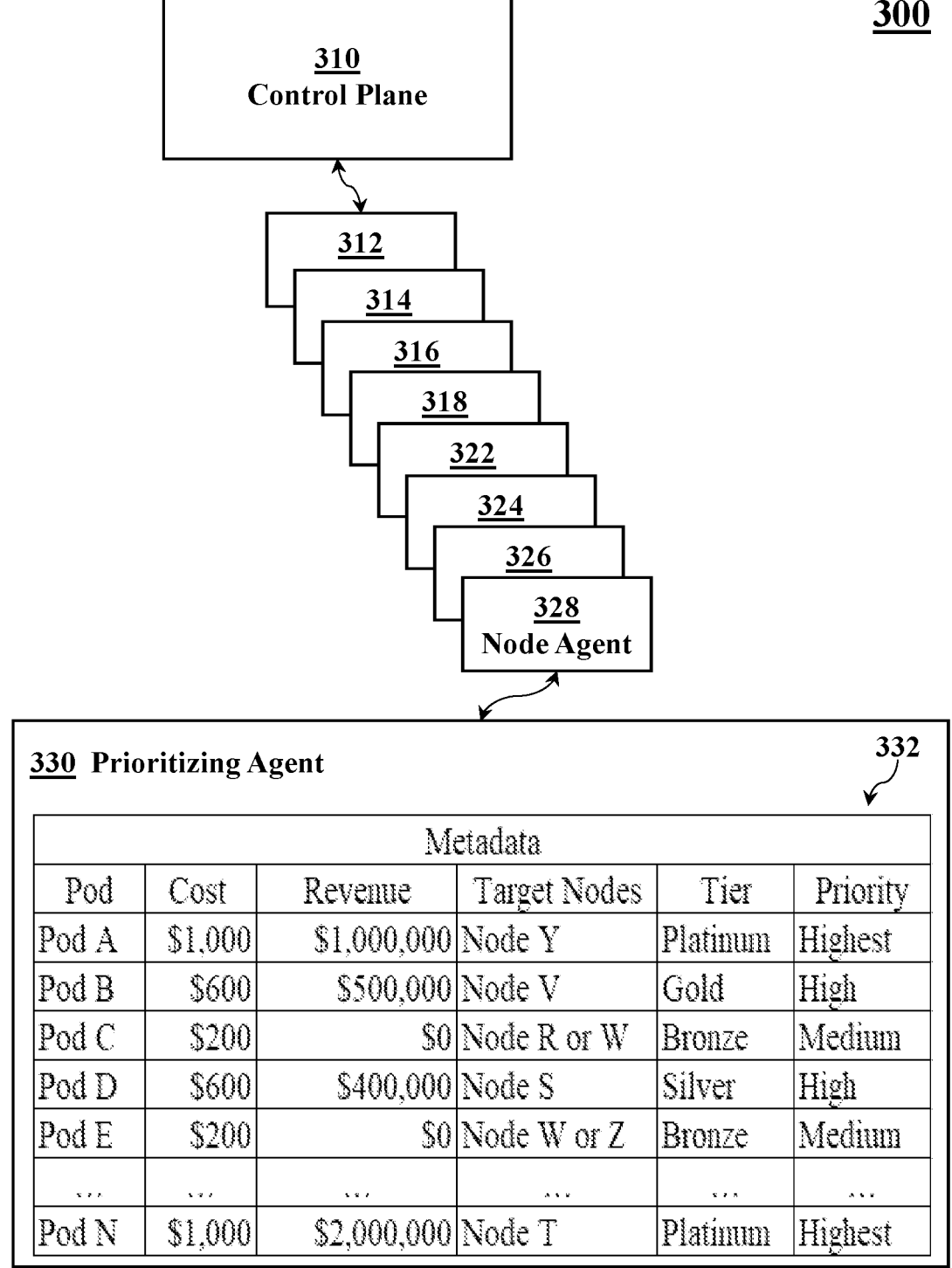
FIG. 3 illustrates an open-source container system in
accordance with some embodiments of the present disclo-
sure.

FIG. 3 illustrates an open-source container system 300 in accordance with some embodiments of the present disclosure. The system 300 includes a control plane 310, nodes with node agents 312, 314, 316, 318, 322, 324, 326, and 328, and a prioritizing agent 330 storing a metadata table 332. The prioritizing agent 330 is in communication with the node agents 312, 314, 316, 318, 322, 324, 326, and 328 in various nodes to collect information about the nodes.

The information stored in the metadata table 332 may be used to assign service tiers to workloads, priorities to pods, and rankings to nodes. The metadata table 332 information and the determinations made therewith (e.g., service tier assignments, pod priority determinations, and/or node rankings) may be used to allocate pods to nodes based on various business interests. These business interests may include both technical and non-technical considerations.

A computer implemented method in accordance with the present disclosure may include compiling cost data for at least one node and revenue data for at least one pod. The method may include calculating a resource value of a node of the at least one node with the cost data and quantifying a priority value of a pod of the at least one pod with the revenue data. The method may include pairing the priority value of the pod with the resource value of the node and assigning the pod to the node.

In some embodiments, the method may include computing a revenue for a service conducted using the pod.

In some embodiments, the method may include determining a trade volume per day per microservice within the pod. The trade volume may incorporate trade volume data. Trade volume data may include one or more of a number of connections, an amount of data, an API calls value, and an interaction frequency. In some embodiments, the method may further include maintaining the trade volume data, the cost data, and the priority data in a database.

In some embodiments, the method may include collecting metadata for the at least one node and the at least one pod and retaining the metadata for a defined retention period.

In some embodiments, the method may include determining a priority tag for the pod with the revenue data and retaining the priority tag for future scheduling of the pod.

In some embodiments, the method may include configuring, by a user, one or more of a cost data collection frequency of the cost data, a revenue data collection frequency of the revenue data, data retention period lengths, and service tier information.

In some embodiments, the method may include tuning the pairing for performance.

Figure 4:
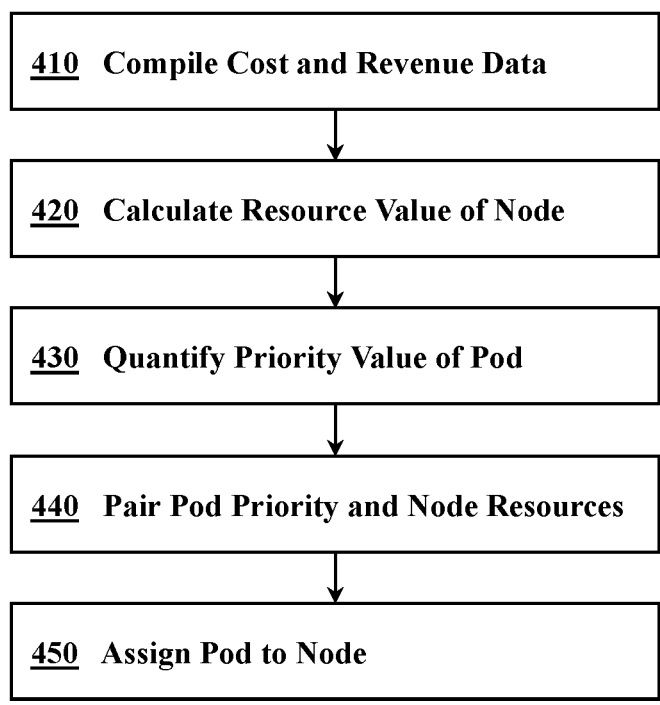
FIG. 4 depicts a method of orchestration in accordance
with some embodiments of the present disclosure.

FIG. 4 depicts a method 400 of orchestration in accordance with some embodiments of the present disclosure. The method 400 includes compiling 410 cost and revenue data. The method 400 includes calculating 420 the resource value of one or more nodes and quantifying 430 the priority value of one or more pods. The pods may be pending deployment or, in some embodiments, the pods may have already been deployed and the system implementing the method 400 may be assessing the ability of changing the host node of one or more deployed pods. The method 400 includes pairing 440 a pod priority (e.g., a calculated business value) with corresponding node resource value (e.g., node rank) and assigning 450 the pod with the priority to the node it was paired with.

A computer program product in accordance with the present disclosure may include a computer readable storage medium having program instructions embodied therewith. The program instructions may be executable by a processor to cause the processor to perform a function. The function may include compiling cost data for at least one node and revenue data for at least one pod. The function may include calculating a resource value of a node of the at least one node with the cost data and quantifying a priority value of a pod of the at least one pod with the revenue data. The function may include pairing the priority value of the pod with the resource value of the node and assigning the pod to the node.

In some embodiments, the function may include computing a revenue for a service conducted using the pod.

In some embodiments, the function may include determining a trade volume per day per microservice within the pod. The trade volume may incorporate trade volume data. Trade volume data may include one or more of a number of connections, an amount of data, an API calls value, and an interaction frequency. In some embodiments, the function may further include maintaining the trade volume data, the cost data, and the priority data in a database.

In some embodiments, the function may include collecting metadata for the at least one node and the at least one pod and retaining the metadata for a defined retention period.

In some embodiments, the function may include determining a priority tag for the pod with the revenue data and retaining the priority tag for future scheduling of the pod.

In some embodiments, the function may include configuring, by a user, one or more of a cost data collection frequency of the cost data, a revenue data collection frequency of the revenue data, data retention period lengths, and service tier information.

In some embodiments, the function may include tuning the pairing for performance.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or that which may be later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but the consumer has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which may include operating systems and applications. The consumer does not manage or control the underlying cloud infrastructure but has control over operating systems, storage, and deployed applications, and the consumer possibly has limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and/or compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
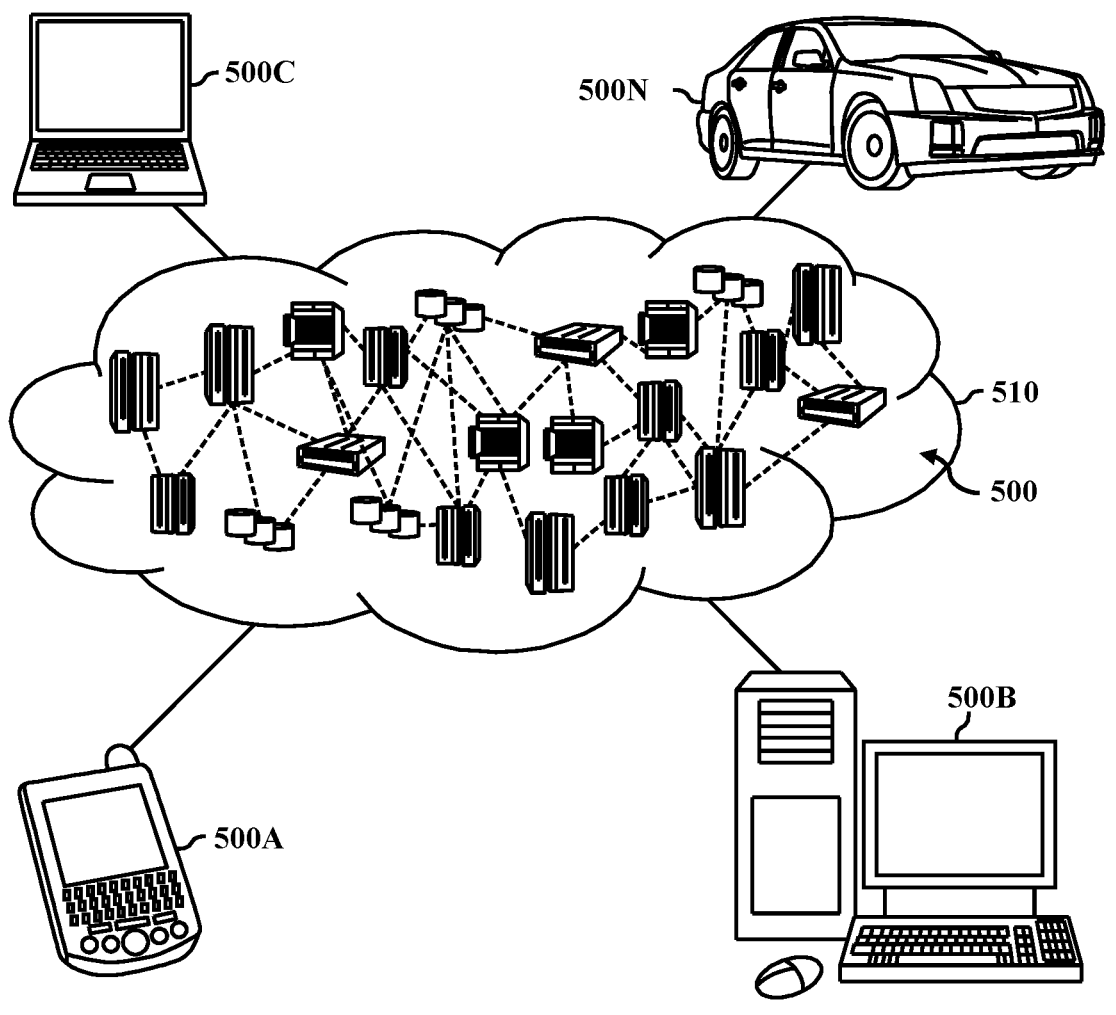
FIG. 5 illustrates a cloud computing environment, in
accordance with embodiments of the present disclosure.

FIG. 5 illustrates a cloud computing environment 510 in accordance with embodiments of the present disclosure. As shown, cloud computing environment 510 includes one or more cloud computing nodes 500 with which local computing devices used by cloud consumers such as, for example, personal digital assistant (PDA) or cellular telephone 500A, desktop computer 500B, laptop computer 500C, and/or automobile computer system 500N may communicate. Nodes 500 may communicate with one another. They may be grouped (not shown) physically or virtually, in one or more networks, such as private, community, public, or hybrid clouds as described hereinabove, or a combination thereof.

This allows cloud computing environment 510 to offer infrastructure, platforms, and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
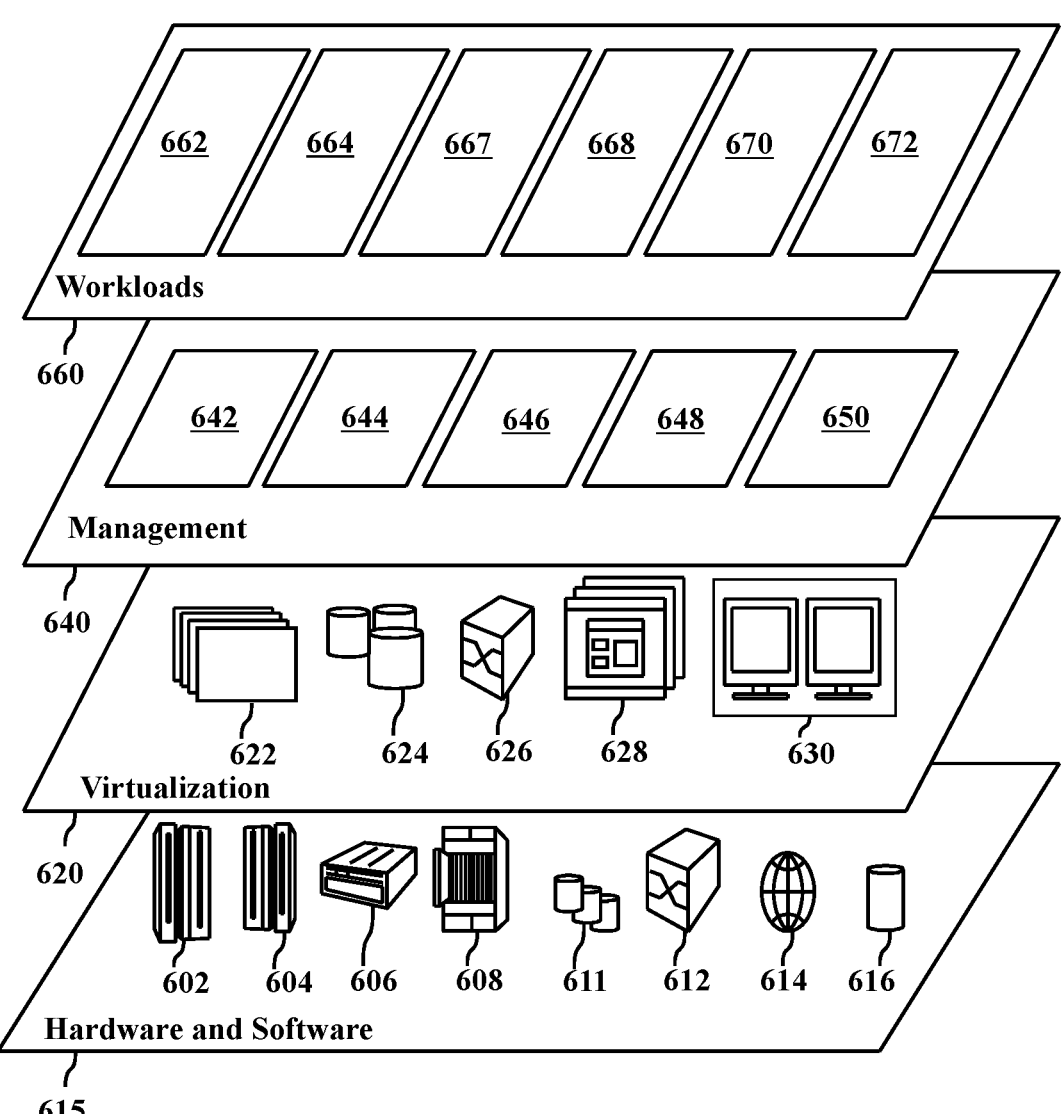
FIG. 6 depicts abstraction model layers, in accordance
with embodiments of the present disclosure.

FIG. 6 illustrates abstraction model layers 600 provided by cloud computing environment 510 (FIG. 5) in accordance with embodiments of the present disclosure. It should be understood in advance that the components, layers, and functions shown in FIG. 6 are intended to be illustrative only and embodiments of the disclosure are not limited thereto. As depicted below, the following layers and corresponding functions are provided.

Hardware and software layer 615 includes hardware and software components. Examples of hardware components include: mainframes 602; RISC (Reduced Instruction Set Computer) architecture-based servers 604; servers 606; blade servers 608; storage devices 611; and networks and networking components 612. In some embodiments, software components include network application server software 614 and database software 616.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630.

In one example, management layer 640 may provide the functions described below. Resource provisioning 642 provides dynamic procurement of computing resources and other resources that are utilized to perform tasks within the cloud computing environment. Metering and pricing 644 provide cost tracking as resources and are utilized within the cloud computing environment as well as billing or invoicing for consumption of these resources. In one example, these resources may include application software licenses. Security provides identity verification for cloud consumers and tasks as well as protection for data and other resources. User portal 646 provides access to the cloud computing environment for consumers and system administrators. Service level management 648 provides cloud computing resource allocation and management such that required service levels are met. Service level agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment may be utilized. Examples of workloads and functions which may be provided from this layer include: mapping and navigation 662; software development and lifecycle management 664; virtual classroom education delivery 667; data analytics processing 668; transaction processing 670; and orchestration of containerized microservices 672.

Figure 7:
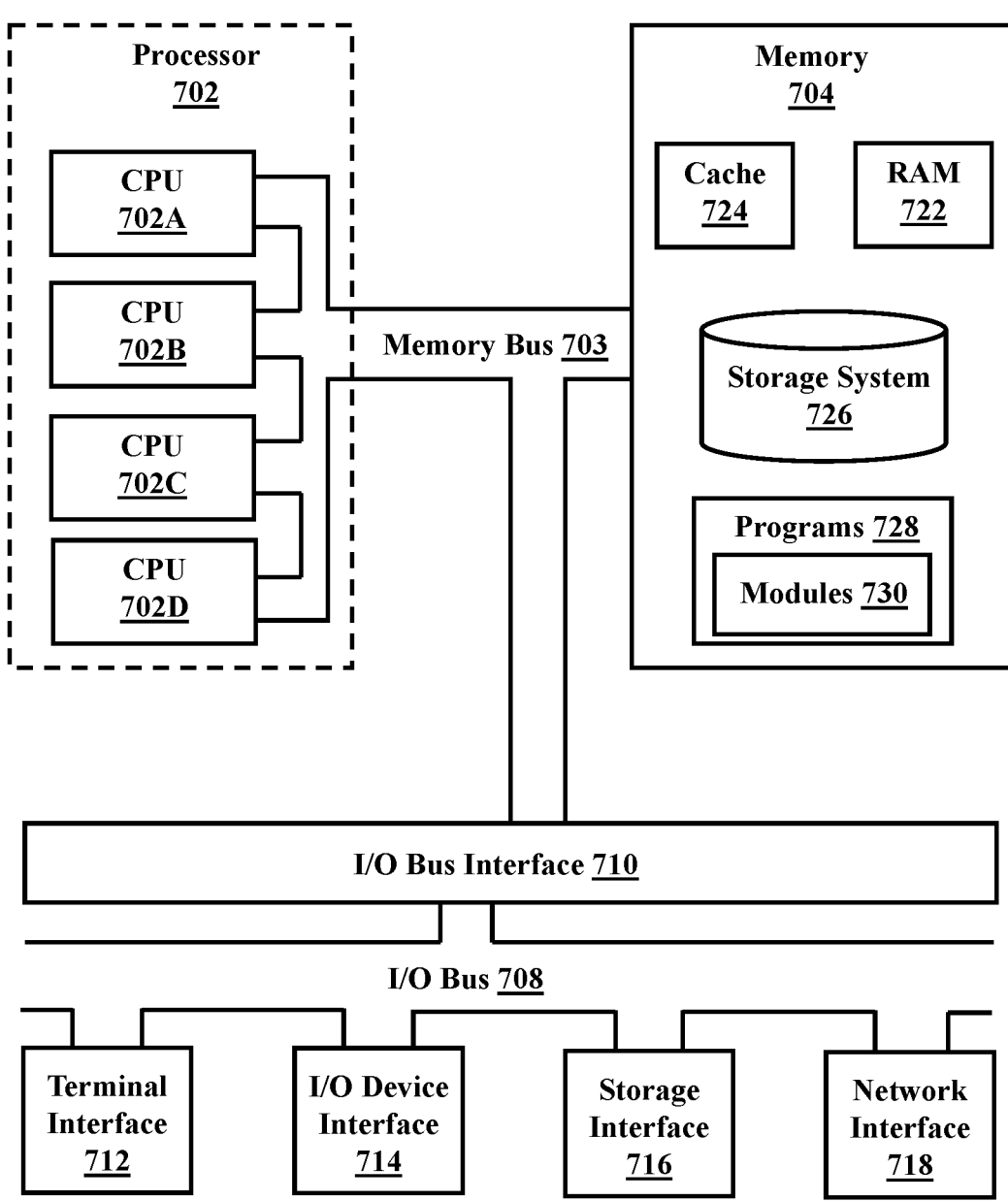
FIG. 7 illustrates a high-level block diagram of an
example computer system that may be used in implementing
one or more of the methods, tools, and modules, and any
related functions, described herein, in accordance with
embodiments of the present disclosure.

FIG. 7 illustrates a high-level block diagram of an example computer system 701 that may be used in implementing one or more of the methods, tools, and modules, and any related functions, described herein (e.g., using one or more processor circuits or computer processors of the computer) in accordance with embodiments of the present disclosure. In some embodiments, the major components of the computer system 701 may comprise a processor 702 with one or more central processing units (CPUs) 702A, 702B, 702C, and 702D, a memory subsystem 704, a terminal interface 712, a storage interface 716, an I/O (Input/Output) device interface 714, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable CPUs 702A, 702B, 702C, and 702D, herein generically referred to as the CPU 702. In some embodiments, the computer system 701 may contain multiple processors typical of a relatively large system; however, in other embodiments, the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM, or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730, may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data, or some combination thereof, may include an implementation of a networking environment. Programs 728 and/or program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star, or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units 710 are shown, which separate the I/O bus 708 from various communications paths running to the various I/O devices, in other embodiments some or all of the I/O devices may be connected directly to one or more system I/O buses 708.

In some embodiments, the computer system 701 may be a multi-user mainframe computer system, a single-user system, a server computer, or similar device that has little or no direct user interface but receives requests from other computer systems (clients). Further, in some embodiments, the computer system 701 may be implemented as a desktop computer, portable computer, laptop or notebook computer, tablet computer, pocket computer, telephone, smartphone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modifications thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A system, said system comprising:
   a memory; and
   a processor in communication with said memory, said processor being configured to perform operations, said operations comprising:
   compiling, with a prioritizing agent, cost data for at least one node and revenue data for at least one pod;
   calculating, with said prioritizing agent, a resource value of a node of said at least one node with said cost data, said resource value comprising a node ranking based on at least one of: (i) an amount of resources available to said at least one node and (ii) a cost of running said at least one node;

quantifying, with said prioritizing agent, a priority value of a pod of said at least one pod with said revenue data;

pairing said priority value of said pod with said resource value of said node;

assigning said pod to said node based on said pairing;

executing a workload in said pod on said node; and dynamically re-prioritizing said pod based on workload changes and re-ranking said node based on resource allocation, to enable value-based pod-to-node assignment for further workload execution.

2. The system of claim 1, said operations further comprising:

computing a revenue for a service conducted using said pod.

3. The system of claim 1, said operations further comprising:

determining a trade volume per day per microservice within said pod, wherein said trade volume incorporates trade volume data including at least one of the group consisting of a number of connections, an amount of data, an API calls value, and an interaction frequency.

4. The system of claim 1, said operations further comprising:

collecting metadata for said at least one node and said at least one pod; and retaining said metadata for a defined retention period.

5. The system of claim 1, said operations further comprising:

determining, for said pod, a priority tag with said revenue data; and retaining said priority tag for future scheduling of said pod.

6. The system of claim 1, said operations further comprising:

configuring, by a user, at least one of the group consisting of a cost data collection frequency of said cost data, a revenue data collection frequency of said revenue data, data retention period lengths, and service tier information.

7. The system of claim 1, said operations further comprising:

tuning said pairing for performance.

8. A computer-implemented method, said computer-implemented method comprising:

compiling, with a prioritizing agent, cost data for at least one node and revenue data for at least one pod;

calculating, with said prioritizing agent, a resource value of a node of said at least one node with said cost data, said resource value comprising a node ranking based on at least one of: (i) an amount of resources available to said at least one node and (ii) a cost of running said at least one node;

quantifying, with said prioritizing agent, a priority value of a pod of said at least one pod with said revenue data;

pairing said priority value of said pod with said resource value of said node;

assigning said pod to said node based on said pairing;

executing a workload in said pod on said node; and dynamically re-prioritizing said pod based on workload changes and re-ranking said node based on resource allocation, to enable value-based pod-to-node assignment for further workload execution.

9. The method of claim 8, further comprising:

computing a revenue for a service conducted using said pod.

10. The method of claim 8, further comprising:

determining a trade volume per day per microservice within said pod, wherein said trade volume incorporates trade volume data including at least one of the group consisting of a number of connections, an amount of data, an API calls value, and an interaction frequency.

11. The method of claim 10, further comprising:

maintaining said trade volume data, said cost data, and said priority data in a database.

12. The method of claim 8, further comprising:

collecting metadata for said at least one node and said at least one pod; and retaining said metadata for a defined retention period.

13. The method of claim 8, further comprising:

determining, for said pod, a priority tag with said revenue data; and retaining said priority tag for future scheduling of said pod.

14. The method of claim 8, further comprising:

configuring, by a user, at least one of the group consisting of a cost data collection frequency of said cost data, a revenue data collection frequency of said revenue data, data retention period lengths, and service tier information.

15. The method of claim 8, further comprising:

tuning said pairing for performance.

16. A computer program product, said computer program product comprising a computer readable storage medium having program instructions embodied therewith, said program instructions executable by a processor to cause said processor to perform a function, said function comprising:

compiling, with a prioritizing agent, cost data for at least one node and revenue data for at least one pod;

calculating, with said prioritizing agent, a resource value of a node of said at least one node with said cost data, said resource value comprising a node ranking based on at least one of: (i) an amount of resources available to said at least one node and (ii) a cost of running said at least one node;

quantifying, with said prioritizing agent, a priority value of a pod of said at least one pod with said revenue data;

pairing said priority value of said pod with said resource value of said node;

assigning said pod to said node based on said pairing; and executing a workload in said pod on said node; and dynamically re-prioritizing said pod based on workload changes and re-ranking said node based on resource allocation, to enable value-based pod-to-node assignment for further workload execution.

17. The computer program product of claim 16, said function further comprising:

determining a trade volume per day per microservice within said pod, wherein said trade volume incorporates trade volume data including at least one of the group consisting of a number of connections, an amount of data, an API calls value, and an interaction frequency.

18. The computer program product of claim 16, said function further comprising:

collecting metadata for said at least one node and said at least one pod; and retaining said metadata for a defined retention period.

19. The computer program product of claim 16, said function further comprising:

determining, for said pod, a priority tag with said revenue data; and retaining said priority tag for future scheduling of said pod.

20. The computer program product of claim 16, said function further comprising:

configuring, by a user, at least one of the group consisting of a cost data collection frequency of said cost data, a revenue data collection frequency of said revenue data, data retention period lengths, and service tier information.

* * * * *